G. KÜBLER.
METHOD OF JOINING METAL ARTICLES.
APPLICATION FILED MAR. 3, 1921.

1,407,202.  Patented Feb. 21, 1922.

Inventor
Gottfried Kübler
By Knight Bros
Attys

UNITED STATES PATENT OFFICE.

GOTTFRIED KÜBLER, OF KIEL-GAARDEN, GERMANY, ASSIGNOR TO FRIED. KRUPP AKTIENGESELLSCHAFT GERMANIAWERFT, OF KIEL-GAARDEN, GERMANY.

METHOD OF JOINING METAL ARTICLES.

1,407,202.  Specification of Letters Patent.  Patented Feb. 21, 1922.

Application filed March 3, 1921. Serial No. 449,506.

*To all whom it may concern:*

Be it known that I, GOTTFRIED KÜBLER, residing at Kiel-Gaarden, Germany, a citizen of the German Republic, have invented a certain new and useful Improvement in Methods of Joining Metal Articles, (for which I have filed an application in Germany, January 21, 1920,) of which the following is a specification.

This invention relates to a method of joining weldable metal articles with such as are non-weldable or which weld only with difficulty.

The novel method of joining is chiefly characterized by the fact that elements of any suitable shape whatsoever and consisting of a good weldable metal are mechanically attached to the metal articles which are made of the non-weldable metal or such welding only with difficulty, and with which the weldable metal articles are then welded in the manner known per se.

The invention will be further described with reference to the accompanying drawing which illustrates some forms of execution of the present method by way of example.

In this drawing—

Figure 1:
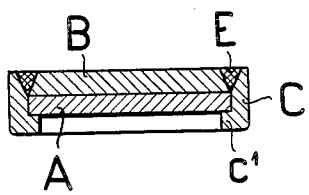

Fig. 1 discloses the manner of joining two circular metal plates.

Figure 2:
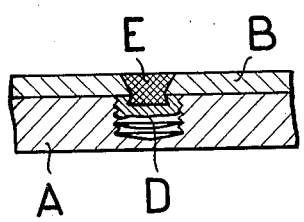
Figure 3:
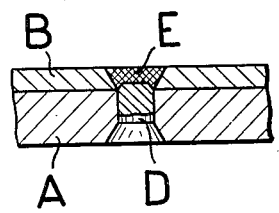
Figure 4:
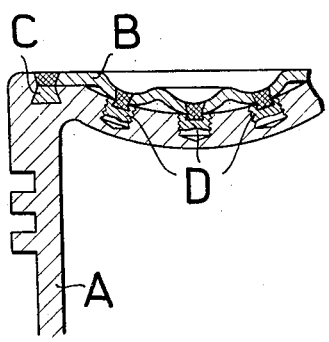
Figure 5:
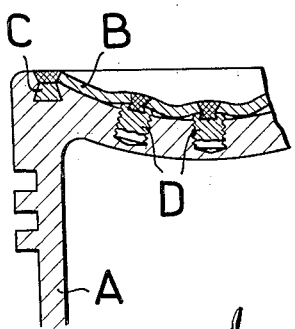

Figs. 2 and 3 are similar views showing the use of a plug as a suitable mechanical supplementary means, Figs. 4 and 5 illustrate the manner of joining a heat insulating plate to the piston head of an internal combustion engine.

In all the figures the two bodies to be interconnected are denoted by the reference letters A and B, respectively, A indicating the body which is non-weldable or weldable only with difficulty, and B the body possessing good welding properties. C and D are the supplementary elements provided in accordance with the invention, and E is the welding metal.

In the form of execution according to Fig. 1 there is illustrated the manner of joining two circular metal plates A and B. This is effected according to the invention by a ring C of weldable metal surrounding the bottom plate A (consisting of non-weldable metal) and which ring engages by aid of a collar $c^1$, the rear face of the plate A, while adapted, moreover, to be fixed to said plate in any other manner deemed expedient. The upper edge of the ring C slightly protrudes beyond the plate A and is intimately united, by means of the welding metal E, with the outer edge of the plate B to be connected to the plate A and for its part consisting of good weldable metal.

In the form of execution according to Fig. 2, where it is a question of joining two similar plates, there is inserted in the centre of the bottom plate A a plug D of good weldable metal. This plug is provided with a depression having the shape of a truncated cone into which the welding metal E is poured on the welding operation after the plate B in which there is formed an opening having the shape of an oppositely disposed truncated cone, has been suitably positioned. The form of execution shown in Fig. 3 differs from the form just described solely by the fact that the plug D has the form of and is inserted after the manner of, a rivet from below into the bottom plate A and slightly projects into the top plate B to be connected. The manner of welding the plug D to the plate B is identically the same as in the example illustrated in Fig. 2.

In the place of a single plug or rivet any desired number of such supplementary elements, adapted to be mechanically connected with the poorly weldable metal plate, may obviously be made use of and arranged in a suitable manner across the entire contact surface of the plates destined to be joined.

For the purpose of avoiding heat stresses when the parts cool down after welding, or whenever there is any liability of the two plates, intended to be joined the one with the other in accordance with this invention suffering unequal degrees of expansion in the course of subsequent service, owing to the different material of which they are made, it has been found expedient to so shape the one of the two plates as to enable it to freely expand in service relatively to the other plate. Such a modified form of execution is illustrated in Fig. 4. In this case it is a question of fitting a heat insulating plate to the piston head of an internal combustion engine. As will be observed, the insulating plate B is welded up both with a dove-tailed ring C inserted along the piston edge, as also with a plurality of plugs D inserted into the piston surface. The plate is provided with an undulating surface which will admit of a free expansion of said insulating plate relatively to the piston head A at different degrees of heating.

The form of execution shown in Fig. 5 and likewise covering a method of joining the piston head to its insulating plate, differs from that according to Fig. 4 merely by the fact that the insulating plate is raised so as to lie hollow at the points where it is jointed with the plugs inserted into the piston head, whereas at the sections between the plugs it lies perfectly close with the piston head. This form of execution will be found to secure a specially favourable transmission and delivery of heat on the part of the insulating plate.

Claims.

1. A method of joining a weldable member with a non-weldable member which consists in mechanically uniting an element of weldable material with the non-weldable member and welding said weldable member to said element, one of said members to be joined having an undulated shape to enable it to expand relative to the other member.

2. A method of joining an undulated shaped metal article of weldable material to a metal article of non-weldable material which consists in mechanically connecting elements of weldable material to said non-weldable article and welding said elements to said weldable article, said undulations permitting an expansion of said weldable article with respect to said non-weldable article.

3. A method of joining an undulated member of weldable material to a member of non-weldable material which consists in mechanically connecting elements of weldable material to said non-weldable member and welding said elements to said undulated member, said latter connections occurring at the crest of said undulations.

4. A method of joining an undulated insulating plate of weldable material to a piston head of non-weldable material which consists in mechanically connecting plugs of weldable material to said piston head and to a dove-tailed ring disposed along the piston edge and welding said undulated plate to said plugs.

The foregoing specification signed at Kiel, Germany, this 6th day of January, 1921.

GOTTFRIED KÜBLER.

In presence of—
F. GULIMAT,
HAGEMANN.